US011718797B2

(12) United States Patent
Castillo et al.

(10) Patent No.: US 11,718,797 B2
(45) Date of Patent: Aug. 8, 2023

(54) DEVICE FOR TREATMENT OF A LIQUID (71) Applicant: Earle Refining LLC, Wall, NJ (US)

(72) Inventors: Jose Miguel Delgado Castillo, Vienna (AT); Anibal Luis Veneciano Rivera, Vienna (AT); Ruediger Uwe Nuerk, Vienna (AT); Fedor Chernikov, Moscow (RU)

( * ) Notice: Subject to any disclaimer, the term of this patent is extended or adjusted under 35 U.S.C. 154(b) by 282 days.

(21) Appl. No.: 16/017,651

(22) Filed: Jun. 25, 2018

(65) Prior Publication Data

US 2018/0355260 A1     Dec. 13, 2018

Related U.S. Application Data

(62) Division of application No. 13/640,932, filed as application No. PCT/AT2011/000184 on Apr. 14, 2011, now Pat. No. 10,053,635.

(30) Foreign Application Priority Data

Apr. 14, 2010   (AT) ..................................... 596/2010
Apr. 14, 2010   (AT) ..................................... 597/2010

(51) Int. Cl.
    *B01J 19/10*            (2006.01)
    *B01J 19/18*            (2006.01)
    (Continued)

(52) U.S. Cl.
    CPC ............... *C10G 15/08* (2013.01); *B01J 19/10* (2013.01); *B01J 19/1806* (2013.01);
    (Continued)

(58) Field of Classification Search
None
See application file for complete search history.

(56) References Cited

U.S. PATENT DOCUMENTS 4,071,225 A    1/1978   Holl
5,763,724 A    6/1998   Bellet et al.
(Continued)

FOREIGN PATENT DOCUMENTS

EP              0667386 A1      8/1995
EP              0673677 A1 *    9/1995          B01F 11/0233
(Continued)

OTHER PUBLICATIONS

English machine translation for RU 2211856 C1. Retrieved from EPO website on May 15, 2020. (Year: 2020).*

(Continued)

*Primary Examiner* — Jennifer A Leung
(74) *Attorney, Agent, or Firm* — Jason Plotkin; Tod Melgar (57) ABSTRACT

A device is configured to increase the portion of low-boiling fractions of a liquid, particularly mineral oil. A device includes a pressure wave generator for generating a pressure wave having a first frequency, in which the pressure wave generator is arranged to subject the liquid to the pressure waves in a region of application, at least one pipe which is arranged through which treated liquid flows after the region of application, and means for exciting the at least one pipe through which such treated liquid flows to oscillations of a second frequency, which is the resonance frequency of the excited system.

15 Claims, 5 Drawing Sheets

(51) Int. Cl.
*C10G 15/08* (2006.01)
*C10G 31/06* (2006.01)
*C02F 1/36* (2023.01)

(52) U.S. Cl.
CPC ......... *B01J 19/1881* (2013.01); *C10G 31/06* (2013.01); *B01J 2219/00162* (2013.01); *B01J 2219/00164* (2013.01); *C02F 1/36* (2013.01); *C10G 2300/1033* (2013.01); *C10G 2300/805* (2013.01)

(56) References Cited

U.S. PATENT DOCUMENTS

| | | | |
|---|---|---|---|
| 5,846,496 | A | 12/1998 | Bellet et al. |
| 6,016,798 | A * | 1/2000 | Selivanov ............. B01J 19/008 126/247 |
| 7,198,724 | B2 | 4/2007 | Clark |
| 2004/0154991 | A1 | 8/2004 | Clark |
| 2004/0159537 | A1 | 8/2004 | Maeda et al. |
| 2008/0236160 | A1 * | 10/2008 | Glotov ............... B01F 13/1013 60/530 |
| 2010/0122933 | A1 | 5/2010 | Khan |
| 2011/0017643 | A1 | 1/2011 | Donchenko et al. |

FOREIGN PATENT DOCUMENTS

| | | | |
|---|---|---|---|
| EP | 1260266 A1 | 11/2002 | |
| GB | 104330 A | 8/1917 | |
| WO | WO-03044430 A1 * | 5/2003 | ............... F23K 5/12 |
| WO | 03/093398 A1 | 11/2003 | |
| WO | 2006/067636 A2 | 6/2006 | |

OTHER PUBLICATIONS

International Search Report dated Jun. 8, 2011, issued in International Application PCT/AT2011 /000184.
Written Opinion of the International Searching Authority, issued in International Application PCT/AT2001/000184.
Kirichenko et al., "Effect of ultrasonic vibrations on thermal cracking", Tr. Kubibyshevsk, Nauchn.-Issled Inst. Neft, Prom., 1962, vol. 16, pp. 116-122 (Abstract).

* cited by examiner

DEVICE FOR TREATMENT OF A LIQUID

CROSS REFERENCE

This application is a divisional application of U.S. application Ser. No. 13/640,932, filed Nov. 15, 2012, which is the U.S. National Stage application filed under 35 USC 371 of PCT/AT2011/000184, filed Apr. 14, 2011, designating the United States, and claims the foreign priority benefit of Austrian Application A 597/2010 filed Apr. 14, 2010 and Austrian Application A 596/2010 filed Apr. 14, 2010, and incorporates herein by reference the complete disclosures of all such applications in their entireties.

FIELD OF THE INVENTIONS

The invention relates to a device for treatment of a liquid. The device is configured for increasing the low boiling fraction(s) in the treatment of a liquid, in particular a mineral oil. In general, the device for the treatment of a liquid, configured for increasing the portion of low-boiling fractions, includes a pressure wave generator for generating a pressure wave(s) having a first frequency, in which the pressure wave generator is arranged to subject the liquid to such pressure waves in a region of application, and piping after the region of application through which the treated liquid flows and means for exciting the piping to oscillations of a second frequency, which is the resonance frequency of the excited system.

BACKGROUND

A method and a corresponding device have become known for example from European patent application EP 1 260 266 A1 and serves to destabilize and brake up chemical bonds in liquids such as mineral oils and like substances in order to obtain an increased portion of short-chain and hence low-boiling fractions in the course of refining. For this purpose mechanical oscillation energy is brought into the liquid in the form of pressure waves which leads to a destruction of chemical bonds and hence to the chain-brake of long-chained, high-boiling molecule fractions. Although the molecular processes that actually occur are not yet completely understood, it is certain that with an appropriate treatment of crude oil and other mineral oils with pressure waves having a specific frequency the distillation profile is favorably shifted towards short-chain, low-boiling fractions so that the yield of high value products from crude oil and mineral oils can be increased. Currently it is assumed that due to the oscillation energy a resonance excitation occurs in the liquid with an appropriate choice of the oscillation frequency, which is responsible for said chain-break.

In EP 1 260 266 A1 a rotor is described as the source of mechanical oscillation, in which rotor the liquid to be treated is directed into a hollow of a rotatably mounted member in which the liquid flows radially outwards and from which the liquid is directed through radial openings in the rotor into an annular gap, the radial openings being arranged in an even manner on the outer surface of the rotor. By the fast rotation of the rotor the liquid in the gap is subjected to oscillating pressure waves having a frequency that is a function of the rotational speed and the number of openings on the outer surface of the rotor so that considerable energy quantities are brought into the liquid and the chemical bonds are destabilized or broken.

SUMMARY

One of our objectives is to improve a method of the initially mentioned kind so that an even more effective pretreatment of the liquid is carried out in order to further increase the portion of low-boiling fractions.

To achieve this objective the method of the initially mentioned kind according to the invention is devised such that at least one pipe flowed through by the treated liquid and immediately following said region of application is excited to oscillations of a second frequency, which is the resonance frequency of the excited system.

A device for this treatment of a liquid, in particular a mineral oil, for increasing the portion of low-boiling fractions, in particular for carrying out our method, comprises a pressure wave generator for generating a pressure wave having a first frequency. The pressure wave generator is arranged to subject the liquid to the pressure waves in a region of application. At least one pipe (piping(s)) is arranged to be flowed through by the treated liquid and arranged to immediately follow the region of application. Means for exciting the pipe to oscillations of a second frequency are provided, which is the resonance frequency of the excited system.

DETAILED DESCRIPTION

Departing from the above mentioned state of the art we have observed that an even more effective pretreatment of the liquid or an even further destabilization of the chemical bonds in the liquid occurs if, in addition to application of said pressure waves having the first frequency, the whole system, which consists of or comprises the pressure wave generator and the pipings leading to and leading away from the pressure wave generator and, of course, containing the liquid flowing through the system is excited to vibrations of a second frequency. This second frequency is a resonance frequency of the entire system, which frequency depends not only on the length, strength, weight and geometry of the pipings, in particular of the recirculation pipe, and all other appliances but also on the damping properties of the ground on which the installation is built. When it is succeeded in performing the application of pressure waves with a particular first frequency that is considered favorable and at the same time excite the whole system to vibrations of a second resonance frequency a particularly effective pretreatment of the liquid occurs and a particularly high portion of the desired low-boiling fractions is obtained in the subsequent distillation or rectification step. The resonance state of the overall system with said second frequency, however, does not in all cases occur offhand and the parameters of operations have to be kept within certain limits during the treatment in order to maintain a resonance state that has been achieved depending on the amounts of liquid to be treated being delivered through the pipings and the oscillator and its density and viscosity.

Preferably said pressure waves having the first frequency are brought into the liquid by the aid of a pressure wave generator connected with the liquid to be treated via flowed through pipings and the system consisting of the piping and, as the case may be, the pressure wave generator is excited to vibrations of the second frequency. The first frequency together with the second frequency act to destabilize chemical bonds in the liquid to be treated, which leads to a distillation profile, which is shifted towards low-boiling fractions of mineral oil.

In order to reliably achieve the resonance state, our method is preferably devised such that a portion of the liquid is withdrawn after passing said region of application and before reaching the tank and that said withdrawn portion of the liquid is refed to said region of application via a recirculation pipe, the pressure in the recirculation pipe being adjusted by the aid of at least one adjustable throttle valve. In our inventive method the application of pressure waves having the first frequency is carried out at frequencies of oscillation known per se from the state of the art, wherein normally no resonance of the overall system occurs. However, by recirculating a portion of the liquid after it has passed the region of application of pressure waves and by varying the pressure in the recirculation pipe by the aid of at least one adjustable throttle valve, which leads to appropriate overpressures and underpressures at the site of withdrawal or the site of refeed, it is accomplished to vary the pressure waves emitted by the pressure wave generator into the overall system in such a way that a resonance of the overall system occurs which remains stable over a certain range of operation parameters as have been mentioned already above.

In addition to the mentioned overpressures and underpressures it seems that also the actual pressure of the liquid within the pressure wave generator may be critical for establishing the resonance state, so that the at least one adjustable throttle valve can also be seen as a means to adjust the exact pressure in the pressure wave generator in order to achieve the resonance state. This particular pressure depends on various factors as already mentioned above. In the resonance state the throughput and the physical properties of the liquid to be treated can hence vary within certain limits without losing the resonance state. Also in the resonance state refeeding of the liquid to be treated via the recirculation pipe can be discontinued or shut down. The inventive mode of operation is again necessary only when the resonance state has been lost due to overly important changes of the parameters of operation and this state has to be induced anew. On the other hand it can be useful to keep a certain flow through the recirculation pipe. As a consequence, a part of the liquid to be treated passes the pressure wave generator several times thereby being subjected to the pressure waves of the first frequency not only once, which leads to an even more intense destabilization of the chemical bonds in the liquid.

The first frequency preferably is chosen in the region between 2 kHz and 150 kHz, in particular between 2 kHz and 20 kHz, which has been found as a range of frequency where destabilization of chemical bonds is maximum. The second frequency normally is different from the first frequency and may well be as high as $10^{15}$ Hz. According to a preferred embodiment of the present invention, the second frequency is applied to the excited system by the aid of an auxiliary oscillator. By the aid of the auxiliary oscillator the second frequency can be deliberately induced to the entire system in order to reliably and quickly achieve the resonance state.

In principle mechanical, electromechanical, piezoelectric and other acoustic emitters can be used as the pressure wave generator. According to a preferred embodiment of the present method, however, it is devised such that the pressure wave generator comprises a rotor flowed through by the liquid to be treated and mounted in a housing, whereby such rotors can also be seen in the mentioned state of the art according to EP 1 260 266 A1.

In practice a mode of operation has turned out to be particularly preferable in which the pressure in the recirculation pipe is adjusted by the aid of two continuously adjustable throttle valves. The two continuously adjustable throttle valves are arranged in the direction of flow in the recirculation pipe consecutively so that the pressure in the recirculation pipe at the site of withdrawal after the pressure wave generator can be adjusted separately from the pressure at the site of refeed. This offers utmost properties of manipulation so that the resonance state can quickly be achieved by experienced personnel.

In one of its aspects, the device for the treatment of a liquid, in particular a mineral oil, for increasing the portion of low-boiling fractions, in particular for carrying out the inventive method, comprises a pressure wave generator for generating a pressure wave having a first frequency, said pressure wave generator being arranged to subject the liquid to said pressure waves in a region of application, and is characterized in that at least one pipe is arranged to be flowed through by the treated liquid and arranged to immediately follow said region of application, wherein means for exciting said pipe to oscillations of a second frequency are provided, which is the resonance frequency of the excited system.

According to a preferred embodiment a recirculation pipe is provided for withdrawing a portion of the treated liquid downstream of the pressure wave generator at a site of withdrawal and for refeeding the treated liquid to the pressure wave generator at a site of refeed upstream of the pressure wave generator, whereby at least one adjustable throttle valve is arranged in the recirculation pipe for adjustment of pressure.

According to a preferred embodiment the device is further embodied such that the pressure wave generator is connected via flowed-through pipings with the liquid to be treated, in particular mineral oil.

Preferably the device is embodied such that the pressure wave generator takes the form of a rotor flowed through by the liquid to be treated and mounted in a housing, the rotor being mounted for rotation with its axle and is embodied as a disc with a ring-shaped wall, in which a plurality of openings is arranged at even distances from each other along the ring-shaped wall and a stator arranged coaxially to the rotor is mounted to form an annular gap between the stator and the ring-shaped wall of the rotor.

For some applications it can be useful to generate not only one first frequency but an additional frequency to destabilize chemical bonds that are generally not affected by the frequency generated by the interaction between the ring-shaped wall of the rotor and stator. To this end the invention is advantageously devised such that the rotor has a disc arranged coaxially with and inside the ring-shaped wall, the disc having a plurality of openings at even distances from each other. If desired the disc can additionally be mounted rotatably against the ring-shaped wall. In this case the disc and the ring-shaped wall of the rotor, by their relative rotatability form an additional system that acts just as the ring-shaped wall of the rotor and the stator. Either way, by choosing an appropriate distance between the evenly spaced openings on the disc a desired additional frequency can be generated. This additional frequency is not to be confused with the second frequency, which is the resonance frequency of the excited system.

In another one of its aspects a device for the treatment of a liquid consisting essentially of mineral oil to increase the portion of low-boiling fractions, comprises a pressure wave generator for generating a pressure wave having a first frequency, said pressure wave generator being arranged to subject the liquid to said pressure waves in an application region, wherein means for exciting a system to oscillations of a second frequency are provided, which is the resonance frequency of the excited system, wherein the excited system comprises the pressure wave generator and piping(s) leading to and leading away from the pressure wave generator and the liquid contained therein, including at least one pipe arranged to be flowed through by the treated liquid and arranged to immediately follow said region of application, wherein a recirculation pipe is provided for withdrawing a portion of the treated liquid downstream of the pressure wave generator at a site of withdrawal and for refeeding the treated liquid to the pressure wave generator at a site of refeed upstream of the pressure wave generator, whereby at least one adjustable throttle valve is arranged in the recirculation pipe for adjustment of pressure.

An inventive method for adjusting the operating point of a pressure wave generator for treating a liquid, in particular a mineral oil with pressure waves of a first frequency for increasing the portion of low-boiling fractions in the liquid is carried out in that the pressure wave generator is communicated with a liquid, in particular water via flowed-through pipings and the frequency of application is varied and the operating point is determined as a maximum in temperature rise of the liquid after passing the pressure wave generator as a function of the frequency of application.

Applicant unexpectedly has made the observation that when the pressure wave generator is operated at a frequency that induces a sudden increase of the temperature of the water communicating with the pressure wave generator then also the actual treatment of the mineral oil is carried out particularly effective. Hence the inventive method affords an especially simple possibility of calibration of the pressure wave generator.

In Table 1 data are represented of test runs performed with crude oil and two different types of pressure wave generators. The values for density and API° represent the density of the crude oil. In addition to the viscosity of the sample, Wt % shows the portion of light, low-boiling fractions.

Line 1 shows the data for an untreated sample of crude oil.

Figure 2:
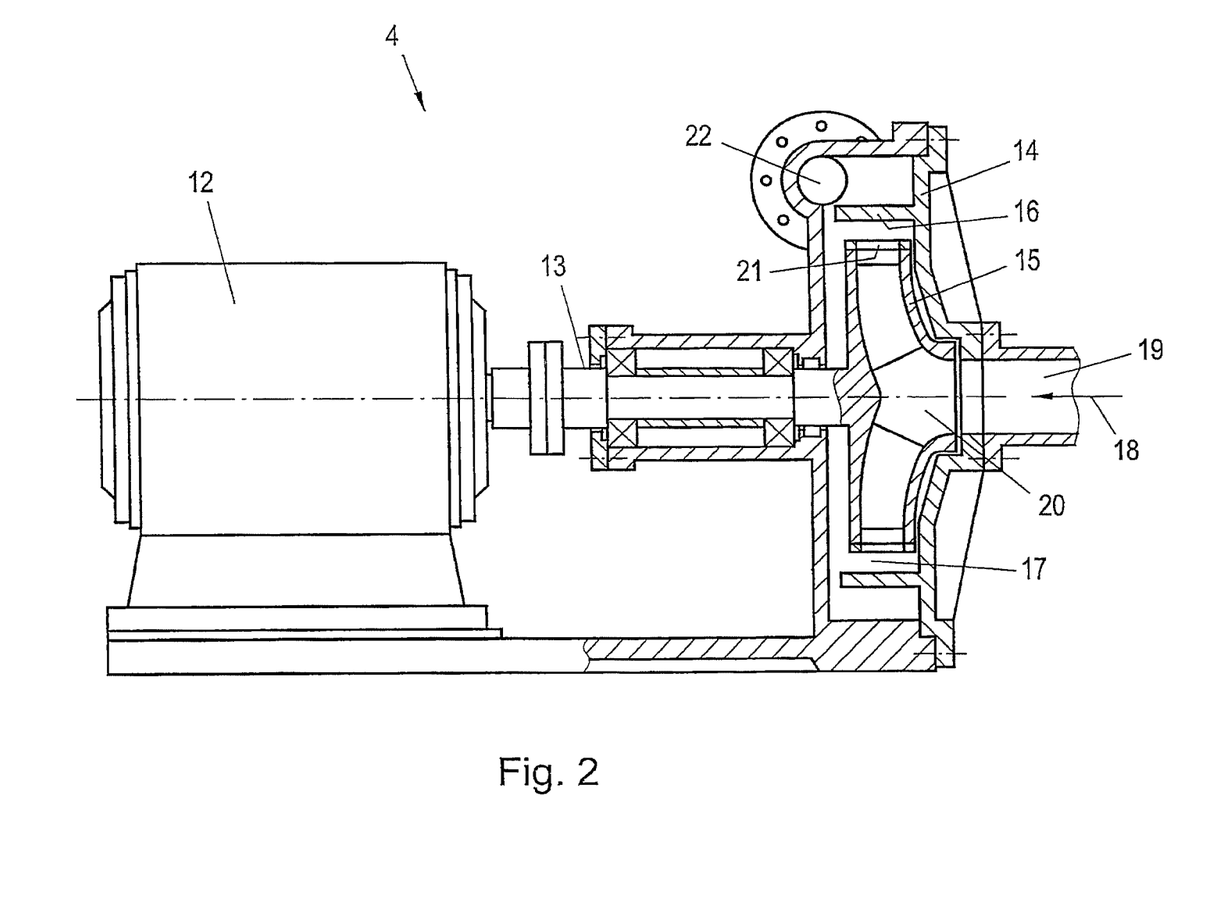
FIG. 2 illustrates a rotor which can be used in carrying out a present method.
Figure 3:
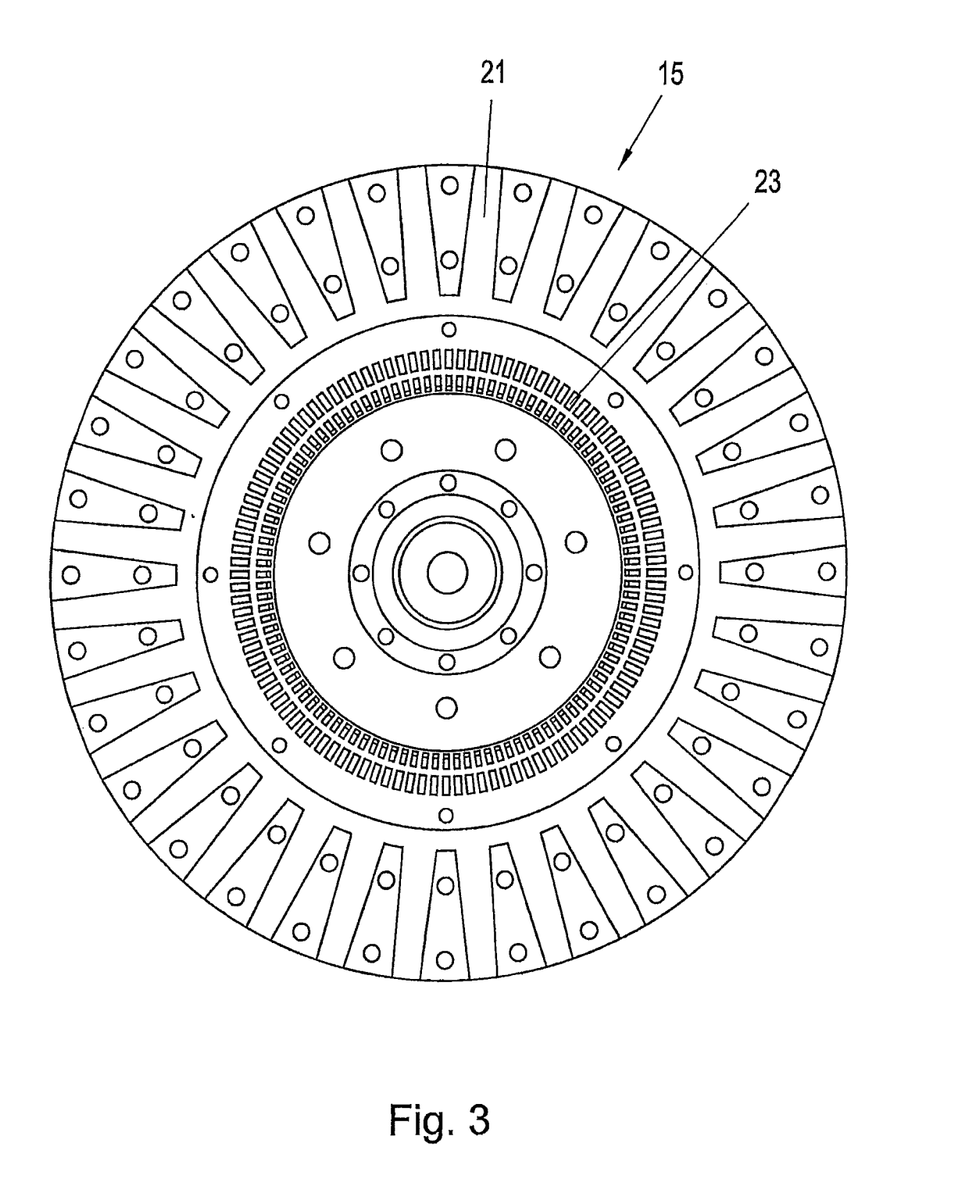
FIG. 3 illustrates another embodiment of the rotor.

Lines 2 and 3 show that after treatment with two different types of pressure wave generators, Line 2 representing treatment with the rotor as described in FIG. 2 and line 3 representing treatment with the rotor described in FIG. 3, a significant increase in the portion of light fractions of the mineral oil was obtained, so that from a sample of crude oil high-value fractions can be obtained.

TABLE 1

| | Description | Density (15° C.) | API° | Viscosity | Wt % |
|---|---|---|---|---|---|
| 1 | Reference sample (fresh crude) | 0.9282 | 20.64 | 254.96 | 33.69 |
| 2 | Treated sample with hydrogen activator | 0.9187 | 22.37 | 121.79 | 46.98 |
| 3 | Treated sample with carbon activator | 0.8890 | 26.50 | 30.47 | 56.99 |

In the following aspects of our inventions will be described in more detail in the drawings by way of a schematically illustrated embodiment.

Figure 1:
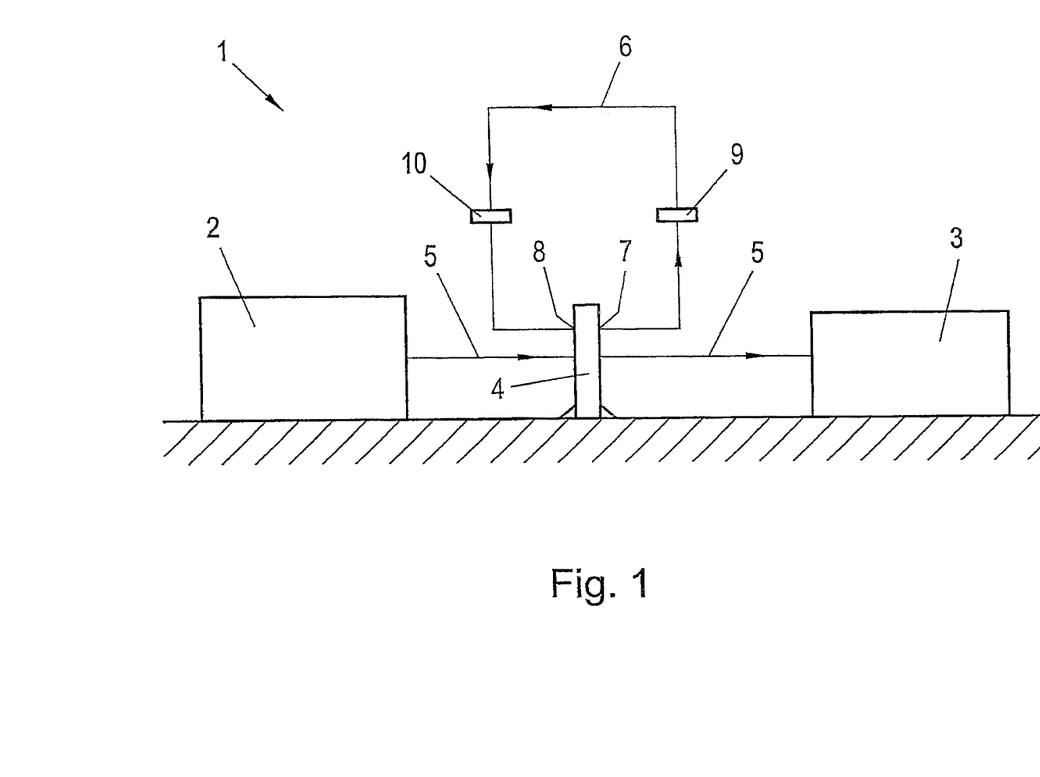
FIG. 1 illustrates a device for carrying out a present method for treating a liquid, for example mineral oil.

In FIG. 1 a device for carrying out the inventive method for treating a liquid, for example a mineral oil is denoted by 1. The device comprises a crude oil tank 2 and a product receptacle 3. The crude oil or mineral oil is pumped or flows from the tank 2 into the receptacle 3 and in doing so passes a pressure wave generator or an oscillator 4, for example in the form of a rotor. Corresponding pipings are denoted by 5. For establishing the resonance state a recirculation pipe 6 is provided which withdraws a portion of the liquid at the site of withdrawal 7 from the oscillator and refeeds this portion of liquid to the oscillator at the site of refeed 8. The pressure at the site of withdrawal 7 can be adjusted via an adjustable throttle valve 9. Irrespective of the pressure drop at the adjustable throttle valve 9 the pressure can further be reduced over the adjustable throttle valve 10 in order to adjust a desired pressure at the site of refeed 8. Depending on the throughput through the pipings 5 and the oscillator 4 and further depending on the physical properties of the conveyed liquid to be treated a propagation of pressure waves emitted by the oscillator 4 into the system of pipings 5 occurs with certain adjustments of the adjustable throttle valves 9 and 10 so that a resonance state is achieved in the whole system which causes the desired destabilization of the chemical bonds in the liquid to be treated.

In FIG. 2 a rotor is depicted which can be used for carrying out the inventive method. The oscillator 4 in addition to a drive 12 and an appropriate power transmission 13 comprises a rotor housing 14 and a rotor 15 that cooperates with a stator 16 mounted to the rotor housing 14. Between the rotor 15 and the stator 16 an annular gap 17 is formed. The liquid to be treated is guided into an inlet opening 19 in the direction of arrow 18 and comes into the interior 20 of the rotor. Due to the centrifugal forces that occur with rotation of the rotor 15 the liquid to be treated in the interior 20 is conveyed towards the stator 16 and can flow into the annular gap 17 via the openings 21 in the rotor 15, the openings 21 being arranged at even distances along the circumference of the rotor 15. The annular gap 17 in FIG. 2 is depicted very large in relation to the rotor 15 and in fact the gap between the rotor 15 and the stator 16 is only a few millimeters, so that in this region due to the rotation of the rotor 15 and the arrangement of the openings 21, pressure waves having a certain frequency are produced so that a considerable energy amount is brought into the liquid to be treated for destabilizing the chemical bonds. The pretreated liquid can be withdrawn via an opening 22 and be conveyed into a product receptacle. The recirculation pipe is connected to the rotor housing 14 at appropriate sites, which in FIG. 1 are denoted by 7 and 8. This kind of rotor is used particularly for destabilizing chemical bonds between neighboring carbon atoms in molecules contained in a liquid to be treated and the rotor of this type is hence termed "carbon activator".

In FIG. 3 an alternative embodiment of the rotor 15 is depicted. On the rotor 15, an additional disc 23 is mounted to the rotor 15. By this measure, an auxiliary frequency is generated that serves to destabilize chemical bonds that are generally unaffected by the frequency generated between the rotor 15 and the stator 16. Both of these frequencies, however, are to be considered first frequencies within the terminology of this invention, since the second frequency is a resonance frequency of the entire system. This kind of rotor is used particularly for destabilizing chemical bonds between carbon atoms and hydrogen atoms in molecules contained in a liquid to be treated and the rotor of this type is hence termed "hydrogen activator".

Figure 4:
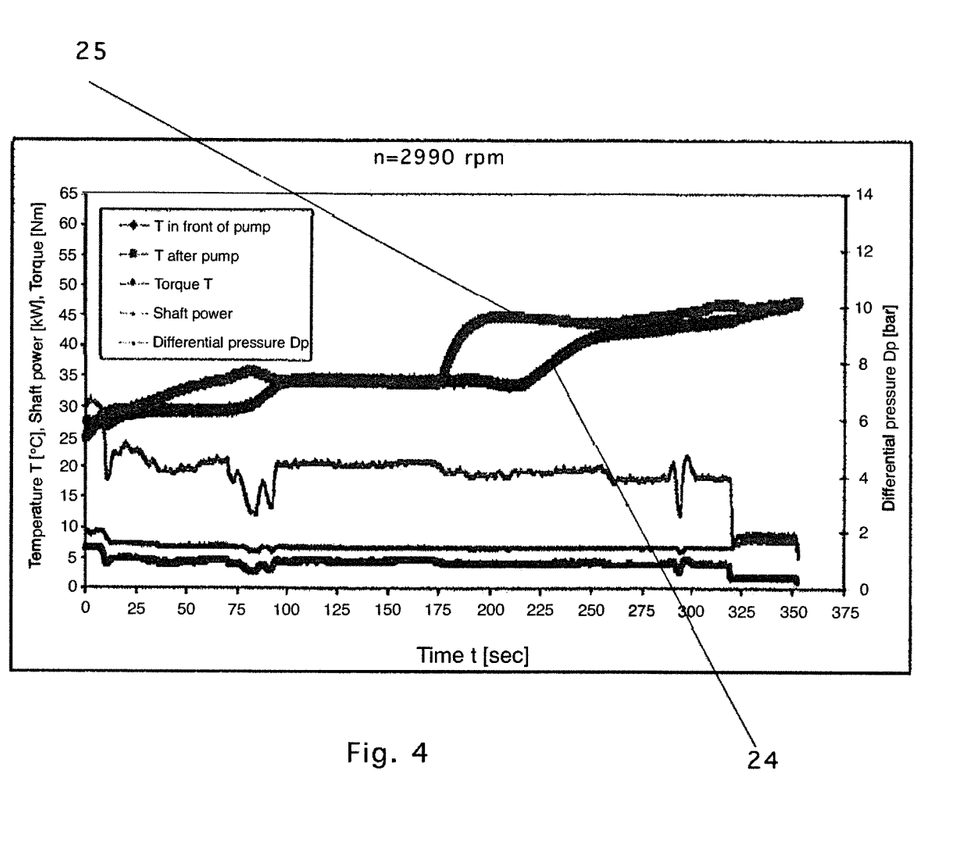
FIG. 4 shows test data and the temperature measured at a site upstream of the oscillator and at a site downstream of the oscillator.

FIG. 4 shows data from a test run and the temperature measured at a site upstream of the oscillator is denoted by and the temperature measured downstream of the oscillator is denoted by 25. The rotary speed in the test run was fixed at 2990 rpm which brought about a maximum rise in the temperature of the water between the two curves after about 200 seconds of operation, the maximum temperature difference amounting to at about 10° C.

Figure 5:
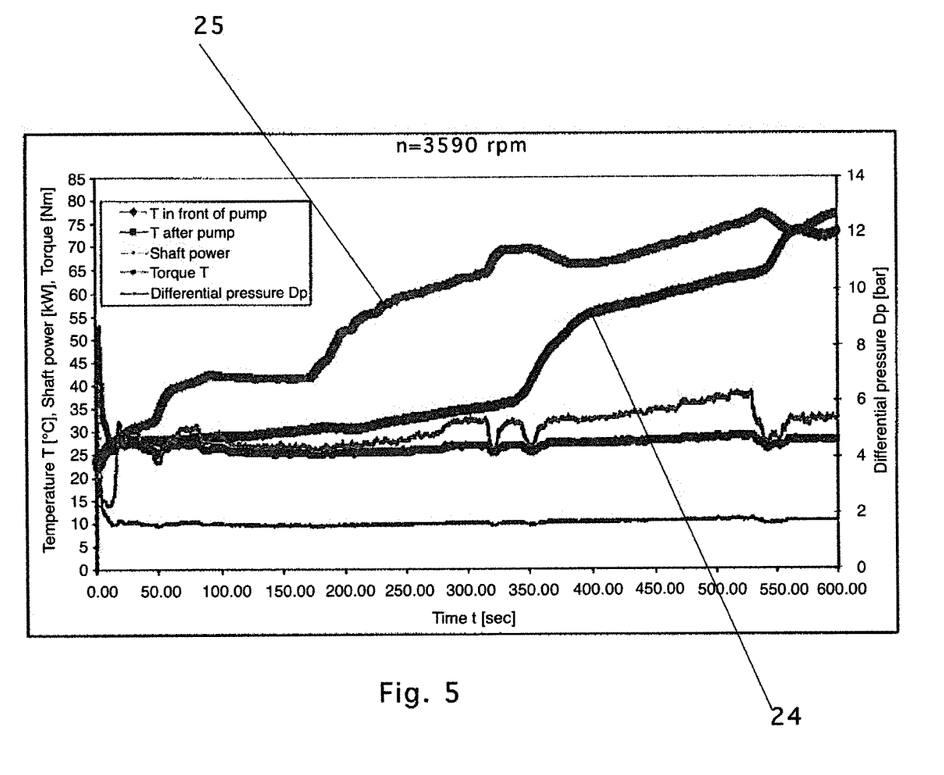
FIG. 5 shows additional test data and the temperature measured at a site upstream of the oscillator and at a site downstream of the oscillator.

In FIG. 5, the same test equipment was run at 3590 rpm. Here, a maximum rise in the temperature of the water between the two curves occurred after about 300 seconds amounting to at about 35° C.

These parameter(s) of operations were hence determined to be optimum for the treatment of the mineral oil.

The invention claimed is:

1. A liquid treatment device for increasing the portion of low-boiling fractions in a mineral oil comprising:
    a pressure wave generator for generating pressure waves having a first frequency, said pressure wave generator being arranged to subject the mineral oil to said pressure waves in a region of application, wherein the first frequency is between 2 kHz and 20 kHz;
    a downstream pipe arranged immediately following said region of application,
    a recirculation pipe connected downstream from the pressure wave generator,
    two throttle valves for exciting said recirculation pipe and mineral oil flowing through the recirculation pipe to oscillations of a second frequency, wherein the second frequency is the resonance frequency of the liquid treatment device, and wherein the second frequency is higher than the first frequency;
    wherein the pressure wave generator comprising a first disc with a ring-shaped wall and a second disc, the ring-shaped wall and the second disc each having a plurality of openings spaced apart at even distances from each other;
    wherein the distance between the openings of the ring-shaped wall is configured to generate pressure waves that destabilize the chemical bonds between neighboring carbon atoms in molecules contained in the mineral oil; and
    wherein the distance between the openings of the second disc are configured to generate pressure waves that destabilize the chemical bonds between carbon atoms and hydrogen atoms in molecules contained in the mineral oil.

2. The liquid treatment device according to claim 1, wherein the recirculation pipe is arranged to withdraw a portion of the mineral oil downstream of the pressure wave generator at a withdrawal site and refeed the mineral oil to the pressure wave generator at a refeed site upstream of the pressure wave generator.

3. The liquid treatment device according to claim 2, wherein the pressure wave generator is connected via an upstream pipe for receiving mineral oil to be treated.

4. The liquid treatment device according to claim 3, wherein the second disc is arranged coaxially with and inside the ring-shaped wall of the first disc and the second disc is rotatable against the ring-shaped wall of the first disc for generating pressure waves of an additional frequency.

5. The liquid treatment device according to claim 4, further comprises:
    a first throttle valve arranged in the recirculation pipe and located proximate to the withdrawal site,
    a second throttle valve arranged in the recirculation pipe and located proximate to a refeed site,
    the first and second throttle valves are arranged in the direction of flow in the recirculation pipe; and wherein each throttle valve is separately adjustable.

6. The liquid treatment device according to claim 1, wherein the pressure wave generator is connected via-an upstream pipe for receiving mineral oil to be treated.

7. The liquid treatment device according to claim 1, wherein the pressure wave generator comprises a housing in which the first and second discs are mounted for rotation, and a stator arranged coaxially to the discs and mounted to form an annular gap between the stator and the ring-shaped wall of the first disc.

8. The liquid treatment device according to claim 7, further comprises:
    a first throttle valve arranged in the recirculation pipe and located proximate to a withdrawal site,
    a second throttle valve arranged in the recirculation pipe and located proximate to a refeed site,
    the first and second throttle valves are arranged in the direction of flow in the recirculation pipe; and wherein each throttle valve is separately adjustable.

9. The liquid treatment device according to claim 7, wherein the second disc is configured to generate an auxiliary frequency.

10. The liquid treatment device according to claim 1, further comprising an auxiliary oscillator for applying the second frequency.

11. The liquid treatment device according to claim 1, wherein the second frequency is less than $10^{15}$ Hz.

12. The liquid treatment device according to claim 1, wherein the first disc and the second disc each generate a pressure wave with a different frequency in the mineral oil.

13. A liquid treatment device for the treatment of a liquid containing mineral oil to increase the portion of low-boiling fractions, comprising:
    a pressure wave generator for generating pressure waves having a first frequency, wherein the first frequency is between 2 kHz and 20 kHz and wherein said pressure wave generator is arranged to subject the liquid to said pressure waves in an application region,
        wherein the pressure wave generator comprises a first disc with a ring-shaped wall and a second disc, the ring-shaped wall and the second disc each having a plurality of openings spaced apart at even distances from each other;
    wherein the distance between the openings of the ring-shaped wall is configured to generate pressure waves that destabilize the chemical bonds between neighboring carbon atoms in molecules contained in the mineral oil; and
    wherein the distance between the openings of the second disc is configured to generate pressure waves that destabilize the chemical bonds between carbon atoms and hydrogen atoms in molecules contained in the mineral oil;
    an upstream piping leading to an upstream side of the pressure wave generator;
    a downstream piping leading away from a downstream side of the pressure wave generator;
    a recirculation pipe arranged to withdraw a portion of the liquid downstream of the pressure wave generator at a withdrawal site and refeed the liquid to the pressure wave generator at a refeed site, upstream of the pressure wave generator; and two throttle valves arranged in the recirculation pipe for adjustment of pressure;
wherein the two throttle valves excite the device to oscillations of a second frequency, which is the resonance frequency of the device, wherein the second frequency is higher than the first frequency.

14. The liquid treatment device according to claim 13, wherein the second frequency is less than $10^{15}$ Hz.

15. The liquid treatment device according to claim 13, further comprises:
   a first throttle valve arranged in the recirculation pipe and located proximate to a withdrawal site,
   a second throttle valve arranged in the recirculation pipe and located proximate to a refeed site,
   the first and second throttle valves are arranged in the direction of flow in the recirculation pipe; and wherein
each throttle valve is separately adjustable.

\* \* \* \* \*